United States Patent
Broucek

(10) Patent No.: US 8,321,782 B1
(45) Date of Patent: Nov. 27, 2012

(54) ANNOUNCEMENT PUZZLE AND ASSOCIATED WEBSITE

(76) Inventor: Eric Francis Broucek, Cary, NC (US)

(*) Notice: Subject to any disclaimer, the term of this patent is extended or adjusted under 35 U.S.C. 154(b) by 0 days.

(21) Appl. No.: 13/135,770

(22) Filed: Jul. 14, 2011

Related U.S. Application Data

(60) Provisional application No. 61/399,786, filed on Jul. 15, 2010.

(51) Int. Cl.
- *G06F 17/00* (2006.01)
- *A63F 9/00* (2006.01)
- *A63F 9/08* (2006.01)
- *A63F 9/06* (2006.01)

(52) U.S. Cl. .................. 715/234; 273/153 R

(58) Field of Classification Search .................. 715/234; 273/153 R
See application file for complete search history.

(56) References Cited

U.S. PATENT DOCUMENTS

| | | | | |
|---|---|---|---|---|
| 6,012,984 | A * | 1/2000 | Roseman | 463/42 |
| 7,510,187 | B2 * | 3/2009 | Haag | 273/157 R |
| 7,815,190 | B1 * | 10/2010 | Krisch et al. | 273/157 R |
| 2006/0163811 | A1 * | 7/2006 | Chuang | 273/157 R |
| 2007/0057458 | A1 * | 3/2007 | Haag | 273/157 R |
| 2008/0083149 | A1 * | 4/2008 | Zebersky | 40/716 |
| 2008/0084025 | A1 * | 4/2008 | Oliphant | 273/153 R |
| 2009/0127785 | A1 * | 5/2009 | Kishon | 273/157 R |
| 2009/0176579 | A1 * | 7/2009 | Herrmann et al. | 463/43 |
| 2009/0225154 | A1 * | 9/2009 | Raymond et al. | 348/51 |
| 2010/0016049 | A1 * | 1/2010 | Shirakawa et al. | 463/9 |
| 2010/0262567 | A1 * | 10/2010 | Berry | 705/500 |
| 2010/0322464 | A1 * | 12/2010 | Beak | 382/100 |
| 2011/0031689 | A1 * | 2/2011 | Binder | 273/157 R |
| 2011/0089632 | A1 * | 4/2011 | Kondo | 273/157 R |

* cited by examiner

*Primary Examiner* — Doug Hutton, Jr.
*Assistant Examiner* — Soumya Dasgupta

(57) ABSTRACT

A jigsaw puzzle and associated web site which provides an entertaining and novel way to give a gift and relay information to select individuals. The puzzle has a code, in addition to the puzzle picture itself, which is displayed when completed. This code gives the puzzle solver access to a web page previously created by the sender of the puzzle. The web page can contain any type of information and data including pictures, videos, music, web links, or items for purchase, for example.

2 Claims, 1 Drawing Sheet

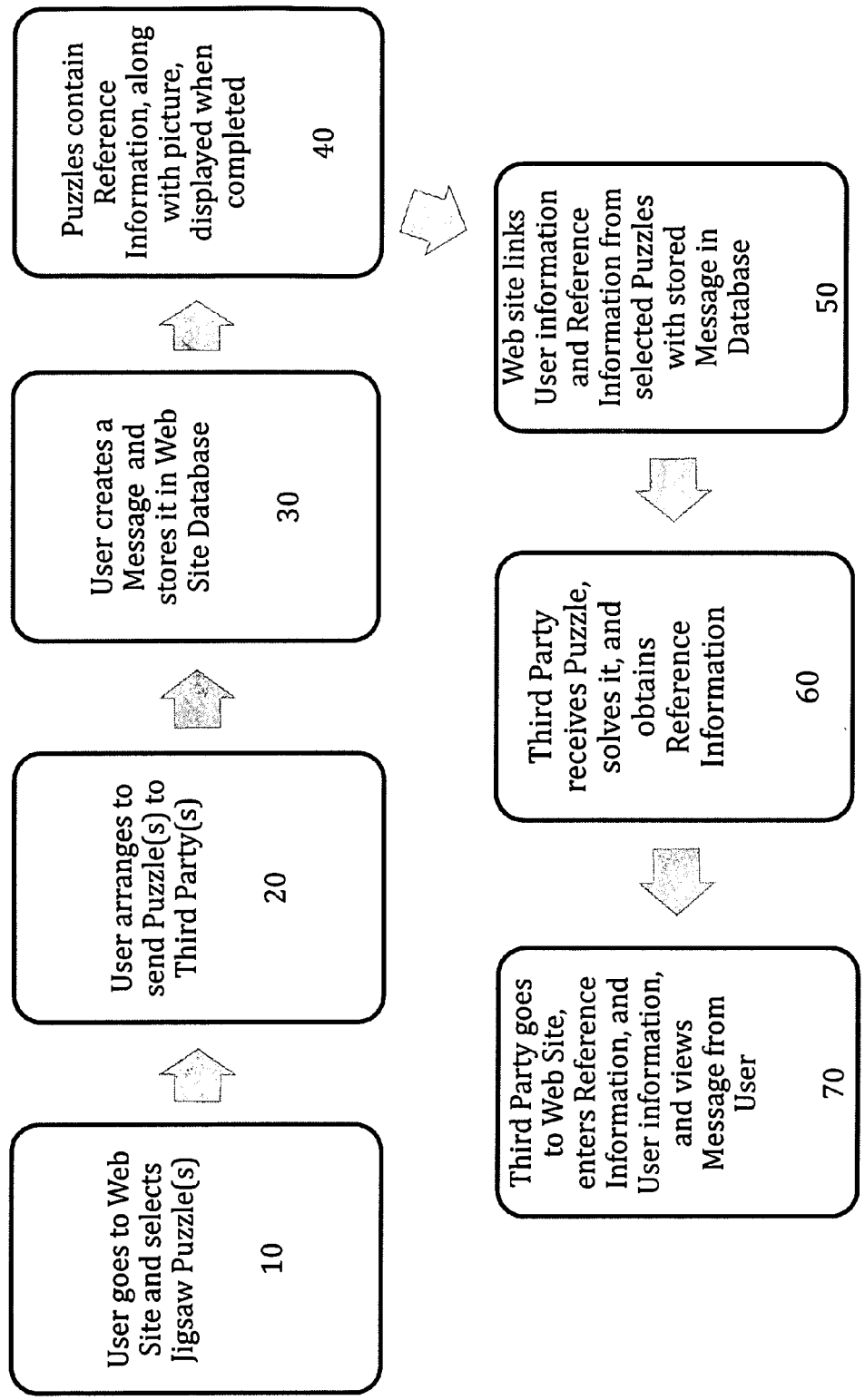

ANNOUNCEMENT PUZZLE AND ASSOCIATED WEBSITE

This Application claims the benefit of Provisional Patent Application No. 61/399,786 filed Jul. 15, 2010, Announcement Puzzle and Associated Website by Eric Broucek

FIELD OF THE INVENTION

The present invention relates generally to jigsaw-type puzzles and, more specifically, to a jigsaw-type puzzle that is associated with a web site and, when solved, contains a code that can be input into a database on the web site to receive any desired information that was created and posted on the web site by the sender of the puzzle.

BACKGROUND OF THE INVENTION

There are a number of important and happy events that often occur in people's lives that they want to share with family and friends. A few examples include getting married and having a baby. Every year in the U.S. alone there are over four million babies born. There are often one or more stages that the person wishes to share news about with others. This is often done with some kind of written announcement or is otherwise just communicated directly in person, by telephone, etc. With a pregnancy, a woman might wish to announce she is pregnant, announce what sex the baby is if determined by a sonogram, and/or announce the birth of the baby. This information is exciting news, especially for grandparents, other family members, and close friends. With a marriage, a couple might wish to announce their engagement, the wedding itself, or even a later anniversary. Announcements and/or invitations relating to things such as graduations, retirements, birthdays, or adoptions are other examples of events that people wish to share with family and friends.

Currently, information about these events is often told to others either verbally or in writing, such as in a birth announcement. It has also gotten popular to send pictures or video around by email or to post pictures and other information on popular social networking sites. The problem with using many of these sites is that whatever information you post to the site on your page is generally available for everyone to see. If you want to announce an event of some kind that you are inviting people to, you don't want anyone that is not invited to view the information. Also, many announcements regarding your personal life are again not for a wide audience but instead for select friends and family.

OBJECTS OF THE INVENTION

It is an object of this invention to give people a fun, creative way to let family and friends know about or be invited to these happy events. It is a further object of this invention to give people an opportunity to give a small gift to those they want to share the information with. It is a further object of the invention to provide suspenseful entertainment to the recipients of the invention. It is a further object of this invention to provide an easy way to gather and display all types of information that one wishes to share with others. It is a further object of this invention to provide a way for people to create a web page that can only be viewed by those that are invited to view the information by receiving a puzzle.

BRIEF DESCRIPTION OF THE FIGURE

FIG. 1 shows the steps involved, the order of the steps, and the elements used to accomplish the steps.

DETAILED DESCRIPTION OF THE INVENTION

The invention is a jigsaw-type puzzle with pieces that fit together to form a complete picture and an associated web site that displays previously created and stored information. The puzzle could have anywhere from two pieces to several thousand pieces. The puzzle can be made of varying levels of difficulty, for children or adults, by increasing or decreasing the number of pieces in the puzzle and by the selection of the colors, patterns, and/or pictures displayed on the puzzle. The completed puzzle can take almost any shape but would typically be rectangular or square. The pieces of the puzzle would commonly be made out of cardboard but materials such as plastic or wood could also be used. The picture on the completed puzzle can be of any visual image that also contains one or more numbers, symbols or letters that make up a code or reference information. Alternatively, the code or reference information could be displayed on the reverse side of the completed puzzle so that the puzzle solver completes the puzzle and flips it over to obtain the code or reference information. The puzzle solver then enters this code or reference information into a data entry field on a web site, along with any other information requested, and the message from the sender of the puzzle, that was created and stored by the sender on the web site at the time he purchased the puzzle, is then displayed for the puzzle solver to view. Software tools that allow a user to upload any type of data file, including pictures, videos, music, web links, catalogues, and even shopping carts for electronic purchases, are well-known in the field of web page creation. In order to have a reference to use to complete the puzzle, there could be a picture of what the completed puzzle looks like without showing the code. This picture can be displayed on the outside of the box containing the puzzle or, alternatively, it can be on a sheet of paper inserted with the puzzle pieces.

Referring to FIG. 1, the steps involved with the preferred embodiment of this invention are as follows:

1. User goes to the web site and selects one or more Puzzles and purchases them online (10). The Puzzle can be of any visual image.
2. User arranges to send the Puzzle(s) to one or more Third Party(s) (20).
3. The web site has a database feature that allows the User to enter and upload various types of data or information that will become the Message and will be displayed as a web page (30). Sender enters some personal information and creates the Message for the Third Party(s) that received the puzzle. The Message could contain text, photos, video, music, links to other sites or any other type of digital information.
4. In addition to the visual image formed when the Puzzle is completed, the Puzzle also contains Reference Information printed on at least one side of the Puzzle that is visible when the Puzzle is completed (40).
5. User information and Reference Information from the puzzles that were selected are associated with the Message stored in the Database (50).
6. The Puzzle(s) are sent to the Third Party(s). The Puzzle contains instructions to complete the Puzzle and obtain the Reference Information and then to go online to the Web Site and enter the requested information about the User, their name for example, along with the Reference Information.
7. Third Party receives the Puzzle, solves the Puzzle, and goes online to the web site (60).

8. Third Party goes to the Web Site, enters the requested User information and the Reference Information, and sees the Message that was created by the User (70).
9. The web site can also ask for the Third Party's name and then send an electronic message to the User that the Third Party has solved the Puzzle and viewed the Message.
10. The Web Site can have features such as email functions between the User and Third Party(s), various social media links and connections to popular social networking sites, links to make travel arrangements for events or purchase tickets, etc.
11. The User can maintain the Message for a period of time that would allow him to update the Message with additional information over time to include such things as photos from the event after it has occurred so everyone that was invited can see the results.
12. The web site can email the Third Party(s) any time after the initial viewing if the User updates the Message so that the Third Party(s) can log back in to see the updated Message.

EXAMPLE

Jane Doe just had a baby boy. She decides to use the invention to announce the birth of her son. She goes to web site and selects a picture of a bunch of babies playing poker for her puzzles. She then selects whether she wants an easy puzzle (50 pieces for example) or a medium puzzle (perhaps 150 pieces) or a difficult puzzle (perhaps 250 pieces or more) for each of the 20 people she is sending the puzzle to. She enters the mailing information for each person she is sending a puzzle to. She then creates her message to the puzzle recipients by uploading any type of information she wants to her message page. She uploads a few minutes of video that was taken right after the baby was born. She uploads a fun song and then uploads some pictures of the baby and family. Finally, she types in a variety of information she wants to share and also puts a link in to a baby store where she has registered for things she wants for the baby so that anyone that wants to send a gift can easily see what she wants and purchase it online. She pays for the puzzles and logs off.

Julie, her best friend from college, is one of the puzzle recipients. She receives the puzzle in the mail. She dumps out the pieces and reads the instructions that tell her to solve the puzzle and then turn it over to get the code that is displayed on the back. She solves the puzzle, flips it over, and sees the numbers 123456 printed on the back of the puzzle. She goes to the web site and is asked to enter her name, the name of the person that sent the puzzle to her, and the code from the completed puzzle. She enters all three pieces of information and is then directed to the web page created by Jane. She views the video and photos and other information with great delight and then clicks the link to the baby store and purchases a baby backpack for Jane as a gift. She also uses the email function within the web site to send a quick note to Jane sending her congratulations. Finally, she enters her email address in order to receive notices anytime anything additional is posted to the page by Jane.

Meanwhile Jane received a notification when Julie logged in to the web site and then received her email a short time later. Jane has also been adding more photos to the web site each day which her friends and family are logging in regularly to view when they receive the update notices.

I claim:

1. A method of creating a jigsaw-type puzzle and associating the puzzle with a website, the method comprising:
    creating, by a user, a message at the website and storing the message in a database at the website;
    selecting, by the user, the one or more jigsaw-type puzzles to send to one or more third parties;
        wherein the jigsaw-type puzzle further comprises a plurality of interlocking or abutting pieces with visual information displayed on at least one side of the pieces, wherein the pieces are correctly assembled to form a visual image and a code,
    displaying the visual image and the code on the completed puzzle, wherein the code comprises one or more symbols, letters, or numbers;
    establishing a link on the web site about the user and the code from the one or more jigsaw-type puzzles selected by the user;
    displaying the message on the website to the one or more third parties when entering information about the user and the code into the database of the web site.
2. The method of claim 1 further comprising:
    assembling the message with a type of information that including includes at least one of text, audio, video, and photographs.

* * * * *